(12) United States Patent
Huang et al.

(10) Patent No.: US 11,974,286 B2
(45) Date of Patent: Apr. 30, 2024

(54) SEQUENCE-BASED PHYSICAL UPLINK CONTROL CHANNEL (PUCCH) COEXISTENCE WITH LEGACY PUCCH FORMATS

(71) Applicant: QUALCOMM Incorporated, San Diego, CA (US)

(72) Inventors: Yi Huang, San Diego, CA (US); Peter Gaal, San Diego, CA (US); Wei Yang, San Diego, CA (US); Tingfang Ji, San Diego, CA (US); Hwan Joon Kwon, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 297 days.

(21) Appl. No.: 17/364,683

(22) Filed: Jun. 30, 2021

(65) Prior Publication Data
US 2022/0046634 A1 Feb. 10, 2022

Related U.S. Application Data

(60) Provisional application No. 63/063,907, filed on Aug. 10, 2020.

(51) Int. Cl.
*H04W 72/21* (2023.01)
*H04L 5/00* (2006.01)

(52) U.S. Cl.
CPC .......... *H04W 72/21* (2023.01); *H04L 5/0044* (2013.01)

(58) Field of Classification Search
None
See application file for complete search history.

(56) References Cited

U.S. PATENT DOCUMENTS

| | | | |
|---|---|---|---|
| 2018/0248720 A1* | 8/2018 | Park | H04B 7/0626 |
| 2018/0324730 A1* | 11/2018 | Lee | H04J 11/0069 |
| 2018/0352568 A1* | 12/2018 | Kim | H04L 5/0053 |
| 2019/0238367 A1* | 8/2019 | Lei | H04L 5/0051 |
| 2020/0137789 A1* | 4/2020 | Matsumura | H04L 5/0053 |

(Continued)

OTHER PUBLICATIONS

International Search Report and Written Opinion—PCT/US2021/045358—ISA/EPO—dated Jan. 20, 2022.

(Continued)

*Primary Examiner* — Rebecca E Song
(74) *Attorney, Agent, or Firm* — QUALCOMM Incorporated

(57) ABSTRACT

Aspects of the present disclosure relate to wireless communications, and more particularly, to techniques for allowing for the coexistence of legacy and non-legacy PUCCH formats. An example method generally includes generating a first orthogonal sequence for a first payload for a physical uplink control channel (PUCCH) to be transmitted; generating a second orthogonal sequence for a second payload for the PUCCH to be transmitted; mapping the first orthogonal sequence to a first set of virtual resources and the second orthogonal sequence to a second set of virtual resources; mapping the first set of virtual resources to a first set of physical resources and the second set of virtual resources to a second set of physical resources; and transmitting the first and second payloads for the PUCCH on the first and second sets of physical resources.

22 Claims, 14 Drawing Sheets

(56) References Cited

U.S. PATENT DOCUMENTS

| | | | |
|---|---|---|---|
| 2020/0163079 A1* | 5/2020 | Choi | H04B 7/0695 |
| 2020/0314881 A1* | 10/2020 | Bagheri | H04L 5/10 |
| 2021/0360615 A1* | 11/2021 | Yang | H04L 5/0007 |
| 2023/0180243 A1* | 6/2023 | Chen | H04L 5/0053 370/329 |

OTHER PUBLICATIONS

Huawei, et al., "UL Channels and Signals in NR Unlicensed Band", 3GPP Draft, R1-1906043, 3GPP TSG RAN WG1 Meeting #97, 3rd Generation Partnership Project (3GPP), Mobile Competence Centre, 650, Route Des Lucioles, F-06921 Sophia-Antipolis Cedex, France vol. RAN WG1, No. Reno, USA, May 13, 2019-May 17, 2019, May 13, 2019 (May 13, 2019), XP051727500, 16 Pages, Retrieved from the Internet: URL: http://www.3gpp.org/ftp/Meetings%5F3GPP%5FSYNC/RAN1/Docs/R1%2D1906043%2Ezip [retrieved on May 13, 2019] Section 3.2.2.

Huawei, et al., "UL Intra-UE Multiplexing," 3GPP Draft, 3GPP TSG RAN WG1 Ad-Hoc Meeting 1901, R1-1900868, 3rd Generation Partnership Project (3GPP), Mobile Competence Centre, 650, Route Des Lucioles, F-06921, Sophia-Antipolis Cedex, France, vol. RAN WG1, No. Taipei; Jan. 21, 2019-Jan. 25, 2019, Jan. 20, 2019 (Jan. 20, 2019), XP051593714, 6 pages, Retrieved from the Internet: URL: http://www.3gpp.org/ftp/Meetings%5F3GPP%5FSYNC/RAN1/Docs/R1%2D1900868%2Ezip [retrieved on Jan. 20, 2019] paragraph [0002].

Interdigital: et al., "Transmission of UCI with Different Reliability Requirements", 3GPP Draft, 3GPP TSG RAN WG1 Meeting #92bis, R1-1804677 (R15 NR WI AI 725 UL Multiplexing), 3rd Generation Partnership Project (3GPP), Mobile Competence Centre, 650, Route Des Lucioles, F-06921 Sophia-Antipolis Cedex, France, vol. RAN WG1, No. Sanya, China, Apr. 16, 2018-Apr. 20, 2018, Apr. 15, 2018, XP051426944, 4 Pages, Retrieved from the Internet URL: http://www.3gpp.org/ftp/Meetings%5F3GPP%5FSYNC/RAN1/Docs/. [Retrieved on Apr. 15, 2018], Sections 1 and 2.2 to 2.4.

Interdigital: et al., "Considerations for Ultra-Reliable UCI Transmission", 3GPP Draft, 3GPP TSG RAN WG 1 Meeting 91, R1-1720553 (R15 NR WI AI 7325 URLLC UCI Transmission), 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 17, 2017 (Nov. 17, 2017), XP051369247, 4 Pages, Retrieved from the Internet: URL: http://www.3gpp.org/ftp/tsg%5Fran/WG1%5FRL1/TSGR1%5F91/Docs/. [Retrieved on Nov. 17, 2017] sections 1. 2.2. 2.3.

Partial International Search Report—PCT/US2021/045358—ISA/EPO—dated Nov. 23, 2021.

\* cited by examiner

Doc

SEQUENCE-BASED PHYSICAL UPLINK CONTROL CHANNEL (PUCCH) COEXISTENCE WITH LEGACY PUCCH FORMATS

CROSS-REFERENCE TO RELATED APPLICATIONS

This application claims benefit to U.S. Provisional Patent Application Ser. No. 63/063,907, entitled "Sequence-Based Physical Uplink Control Channel (PUCCH) Coexistence with Legacy PUCCH Formats," filed Aug. 10, 2020 and assigned to the assignee hereof, the contents of which are hereby incorporated by reference in its entirety.

TECHNICAL FIELD

Aspects of the present disclosure relate to wireless communications, and more particularly, to techniques for allowing for the coexistence of a sequence-based physical uplink control channel (PUCCH) and a legacy PUCCH format in a same resource.

BACKGROUND

Wireless communication systems are widely deployed to provide various telecommunication services such as telephony, video, data, messaging, broadcasts, etc. These wireless communication systems may employ multiple-access technologies capable of supporting communication with multiple users by sharing available system resources (for example, bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (for example, 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several innovative aspects, no single one of which is solely responsible for the desirable attributes.

One innovative aspect of the subject matter described in this disclosure can be implemented in a method for wireless communication by a user equipment (UE). The method generally includes generating a first orthogonal sequence for a first payload for a physical uplink control channel (PUCCH) to be transmitted; generating a second orthogonal sequence for a second payload for the PUCCH to be transmitted; mapping the first orthogonal sequence to a first set of virtual resources and the second orthogonal sequence to a second set of virtual resources; mapping the first set of virtual resources to a first set of physical resources and the second set of virtual resources to a second set of physical resources; and transmitting the first and second payloads for the PUCCH on the first and second sets of physical resources.

One innovative aspect of the subject matter described in this disclosure can be implemented in a method for wireless communication by a network entity. The method generally includes receiving, in a common resource, a first payload for a physical uplink control channel (PUCCH) multiplexed with a second payload for the PUCCH, wherein the first payload for the PUCCH is received from a first user equipment (UE) and the second payload for the PUCCH is received from a second user equipment (UE); decoding the first payload for the first UE from resource elements in the common resource; decoding the second payload for the second UE from resource elements in the common resource; and taking one or more actions based on decoding the first and second payloads One innovative aspect of the subject matter described in this disclosure can be implemented in a method for wireless communication by a network entity. The method generally includes receiving, from a user equipment (UE), a first payload for a physical uplink control channel (PUCCH) and a second payload for the PUCCH on a common resource; mapping a first set of physical resources used for the first payload to a first set of virtual resources and mapping a second set of physical resources used for the second payload to a second set of virtual resources; mapping a first orthogonal sequence to the first set of virtual resources and a second orthogonal sequence to the second set of virtual resources; decoding the first orthogonal sequence from the first set of virtual resources and the second orthogonal sequence from the second set of virtual resources; and taking one or more actions based on the decoded first and second orthogonal sequences Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail some illustrative features of the one or more aspects. These features are indicative, however, of but a few of the various ways in which the principles of various aspects may be employed.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure relate to wireless communications, and more particularly, to mobility techniques that allow for the coexistence of a sequence-based physical uplink control channel (PUCCH) and a legacy PUCCH format in a same resource.

The following description provides examples of coexistence of a sequence-based physical uplink control channel (PUCCH) and a legacy PUCCH format in a same resource, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
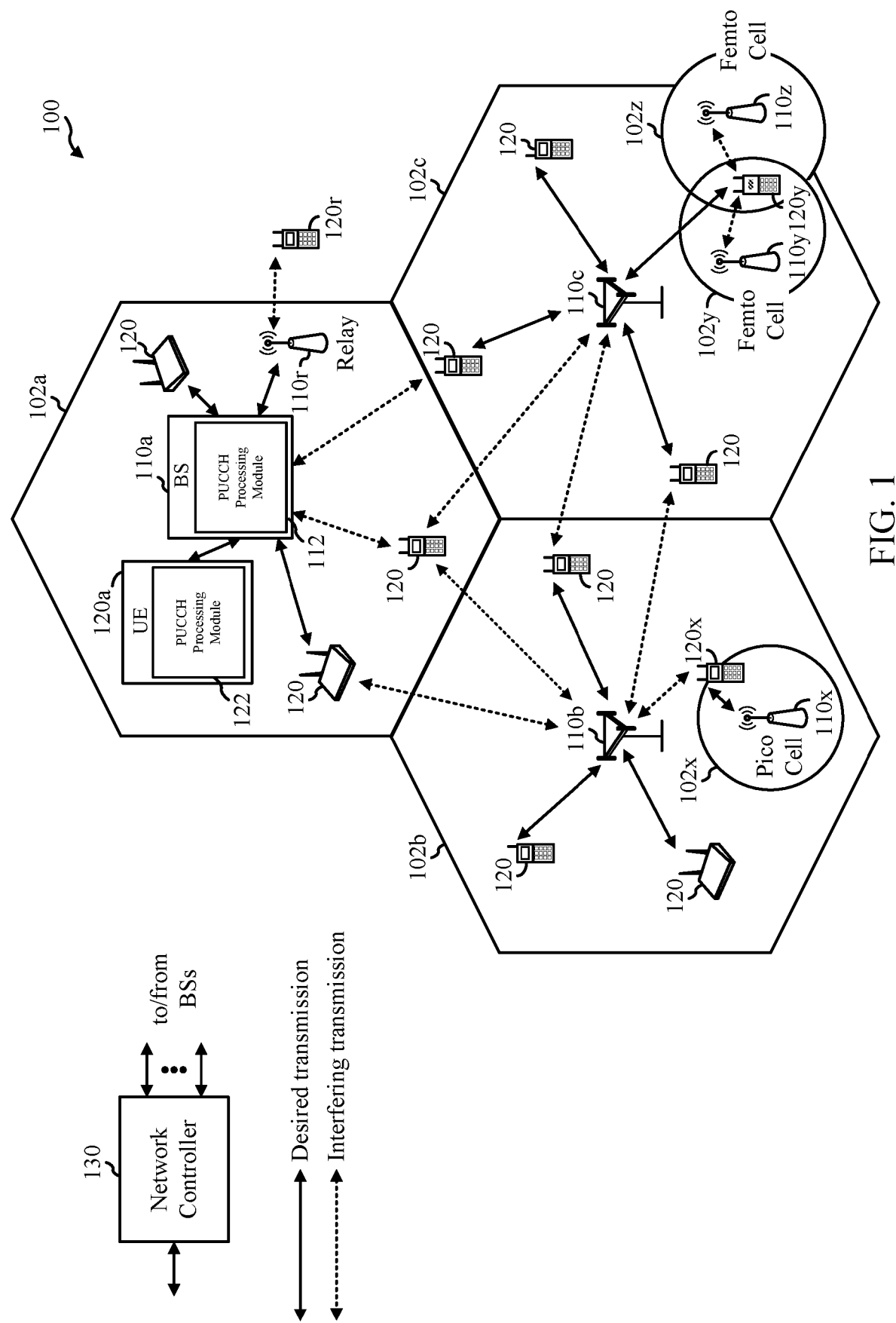
FIG. 1 shows an example wireless communication network in which some aspects of the present disclosure may be performed.

FIG. 1 illustrates an example wireless communication network 100 in which aspects of the present disclosure may be performed. For example, as shown in FIG. 1, UE 120a may include a PUCCH processing module 122 that may be configured to perform (or cause UE 120a to perform) operations 500 of FIG. 5. Similarly, a BS 110a may include a PUCCH processing module 112 that may be configured to perform (or cause BS 110a to perform) operations 600 of FIG. 6 or operations 700 of FIG. 7.

NR access (for example, 5G NR) may support various wireless communication services, such as enhanced mobile broadband (eMBB) targeting wide bandwidth (for example, 80 MHz or beyond), millimeter wave (mmWave) targeting high carrier frequency (for example, 25 GHz or beyond), massive machine type communications MTC (mMTC) targeting non-backward compatible MTC techniques, or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same time-domain resource (for example, a slot or subframe) or frequency-domain resource (for example, component carrier).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another or to one or more other BSs or network nodes (not shown) in wireless communication network 100 through various types of backhaul interfaces (for example, a direct physical connection, a wireless connection, a virtual network, or the like) using any suitable transport network. In the example shown in FIG. 1, the BSs 110a, 110b and 110c may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple cells. The BSs 110 communicate with user equipment (UEs) 120*a-y* (each also individually referred to herein as UE 120 or collectively as UEs 120) in the wireless communication network 100. The UEs 120 (for example, 120*x*, 120*y*, etc.) may be dispersed throughout the wireless communication network 100, and each UE 120 may be stationary or mobile.

Wireless communication network 100 may also include relay stations (for example, relay station 110*r*), also referred to as relays or the like, that receive a transmission of data or other information from an upstream station (for example, a BS 110*a* or a UE 120*r*) and sends a transmission of the data or other information to a downstream station (for example, a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (for example, directly or indirectly) via wireless or wireline backhaul.

Figure 2:
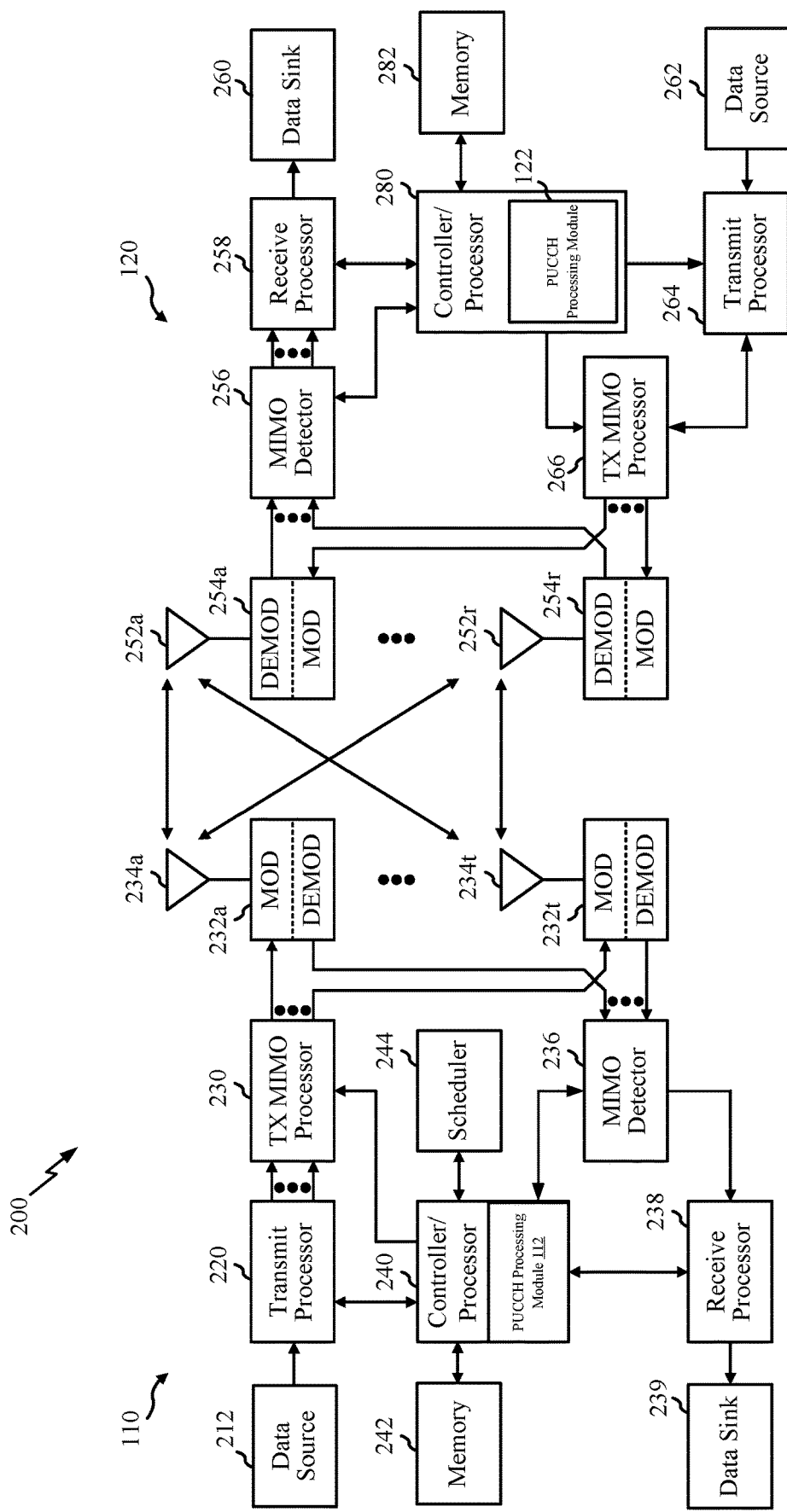
FIG. 2 shows a block diagram illustrating an example base station (BS) and an example user equipment (UE) in accordance with some aspects of the present disclosure.

FIG. 2 shows a block diagram illustrating an example base station (BS) and an example user equipment (UE) in accordance with some aspects of the present disclosure.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (for example, encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (for example, precoding) on the data symbols, the control symbols, or the reference symbols, if applicable, and may provide output symbol streams to the modulators (MODs) 232*a*-232*t*. Each modulator 232 may process a respective output symbol stream (for example, for OFDM, etc.) to obtain an output sample stream. Each modulator may further process (for example, convert to analog, amplify, filter, and upconvert) the output sample stream to obtain a downlink signal. Downlink signals from modulators 232*a*-232*t* may be transmitted via the antennas 234*a*-234*t*, respectively.

At the UE 120, the antennas 252*a*-252*r* may receive the downlink signals from the BS 110 and may provide received signals to the demodulators (DEMODs) in transceivers 254*a*-254*r*, respectively. Each demodulator 254 may condition (for example, filter, amplify, downconvert, and digitize) a respective received signal to obtain input samples. Each demodulator may further process the input samples (for example, for OFDM, etc.) to obtain received symbols. A MIMO detector 256 may obtain received symbols from all the demodulators 254*a*-254*r*, perform MIMO detection on the received symbols if applicable, and provide detected symbols. A receive processor 258 may process (for example, demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (for example, for the physical uplink shared channel (PUSCH)) from a data source 262 and control information (for example, for the physical uplink control channel (PUCCH) from the controller/processor 280. The transmit processor 264 may also generate reference symbols for a reference signal (for example, for the sounding reference signal (SRS)). The symbols from the transmit processor 264 may be precoded by a TX MIMO processor 266 if applicable, further processed by the demodulators in transceivers 254*a*-254*r* (for example, for SC-FDM, etc.), and transmitted to the BS 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The memories 242 and 282 may store data and program codes for BS 110 and UE 120, respectively. A scheduler 244 may schedule UEs for data transmission on the downlink or uplink.

The controller/processor 280 or other processors and modules at the UE 120 may perform or direct the execution of processes for the techniques described herein. As shown in FIG. 2, the controller/processor 280 of the UE 120 has a PUCCH processing module 122 that may be configured to perform (or cause UE 120 to perform) operations 500 of FIG. 5. Similarly, the BS 120*a* may include a PUCCH processing module 112 that may be configured to perform (or cause BS 110*a* to perform) operations 600 of FIG. 6 or operations 700 of FIG. 7.

Figure 3A:
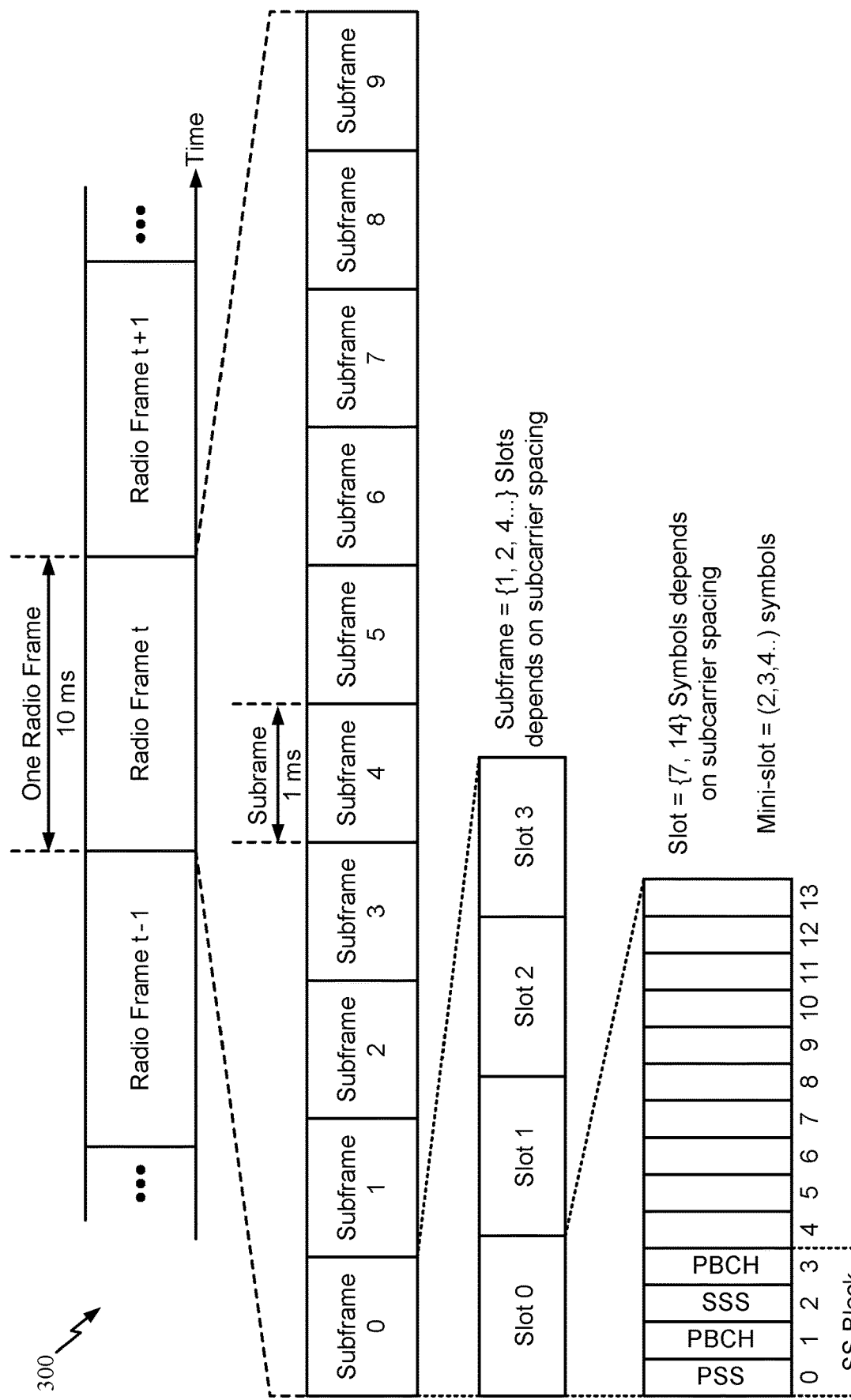
FIG. 3A illustrates an example of a frame format for a telecommunication system.

FIG. 3A is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3A. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping.

Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

Figure 3B:
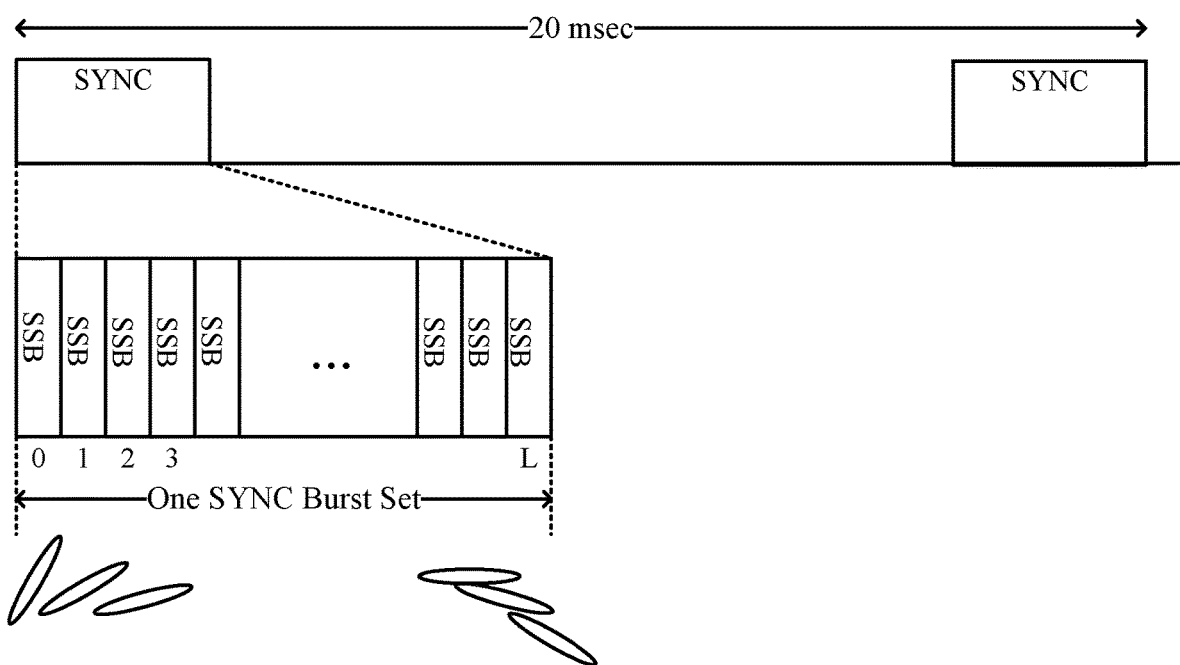
FIG. 3B illustrates how different synchronization signal blocks (SSBs) may be sent using different beams.

As shown in FIG. 3B, the SS blocks may be organized into SS burst sets to support beam sweeping. As shown, each SSB within a burst set may be transmitted using a different beam, which may help a UE quickly acquire both transmit (Tx) and receive (Rx) beams (particular for mmW applications). A physical cell identity (PCI) may still decoded from the PSS and SSS of the SSB.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE. According to aspects of the present disclosure, a CORESET is a set of time and frequency domain resources, defined in units of resource element groups (REGs). Each REG may comprise a fixed number (e.g., twelve) tones in one symbol period (e.g., a symbol period of a slot), where one tone in one symbol period is referred to as a resource element (RE). A fixed number of REGs may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE, and the UE may receive the NR-PDCCH by searching in search spaces for the UE and decoding the NR-PDCCH transmitted by the NodeB.

Example Coexistence of Sequence-Based and Legacy Physical Uplink Control Channel (PUCCH) Format Payloads in a Same Resource Aspects of the present disclosure relate to wireless communications, and more particularly, to configuring resources for allowing for the coexistence of a sequence-based physical uplink control channel (PUCCH) and a legacy PUCCH format in a same resource. As will be described in greater detail below, physical-to-virtual resource mappings and various codebooks may be configured to allow for sequence-based PUCCH and legacy PUCCH format payloads to coexist in a same resource.

Figure 4:
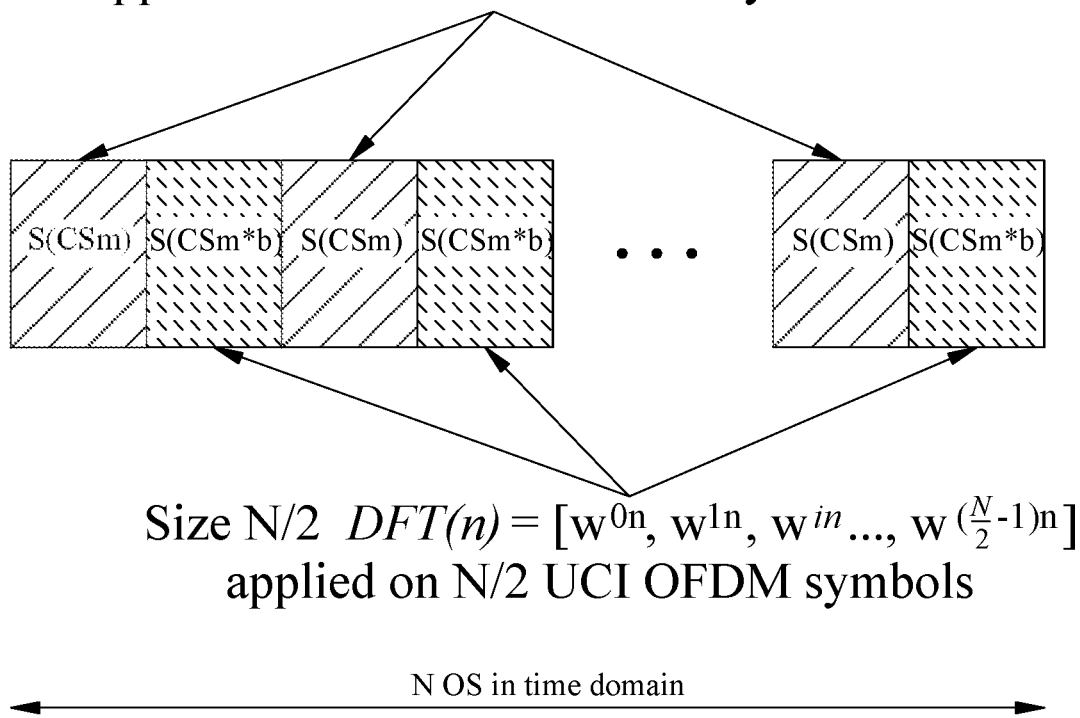
FIG. 4 illustrates an example legacy physical uplink control channel (PUCCH) payload format.

FIG. 4 illustrates an example of a legacy PUCCH format. The legacy format may be an NR Release 15 format 1 PUCCH in which a sequence $S(CS_m)$ is transmitted on a DMRS symbol, while $S(CS_m)*b$ is transmitted, where b is a quadrature phase shift key (QPSK) modulated uplink control information comprising 1 or 2 bits. To support multiple legacy PUCCHs on a same resource (e.g., a resource block), a discrete Fourier transform (DFT) index n and a cyclic shift index m pair (n, m) may be assigned to a UE. With the assigned pair of DFT index n and cyclic shift index m, a cyclic shift associated with index m may be applied to a base sequence s. A DFT vector with DFT index n may be applied to DMRS symbols as an orthogonal cover code, and a same DFT vector with DFT index n may be applied to UCI symbols as an orthogonal cover code. For example, with fourteen symbols in a physical uplink control channel, seven orthogonal symbols in the time domain may be reserved for a demodulation reference signal (DMRS), and seven orthogonal symbols may be reserved for UCI. The DFT OCC vector n may be selected from row n in a size seven DFT matrix.

In some cases, a Release 15 format 1 (legacy) PUCCH may transmit a sequence S on N/2 DMRS symbols, and a sequence S*b may be transmitted on N/2 UCI symbols. For various reasons, it may not be possible to maintain orthogonality between the symbols of a legacy PUCCH and a non-legacy PUCCH across both DMRS and UCI OFDM symbols. When orthogonality may not be maintained between the symbols of a legacy PUCCH and a non-legacy PUCCH across both DMRS and UCI OFDM symbols, a network entity may not be able to recover one or both of the legacy PUCCH and the non-legacy PUCCH.

To allow for coexistence of a legacy and a non-legacy PUCCH, aspects of the present disclosure provide for physical-to-virtual resource mappings and various codebooks that may be configured. These physical-to-virtual resource mappings and codebooks may allow for sequence-based PUCCH and legacy PUCCH format payloads to coexist in a same resource. For example, these physical-to-virtual resource mappings and codebooks may be configured so that the legacy PUCCH and non-legacy PUCCH format payloads use different DFT indices and different cyclic shift indices to avoid collisions and allow for the coexistence of legacy and non-legacy PUCCH in the same resources.

Figure 5:
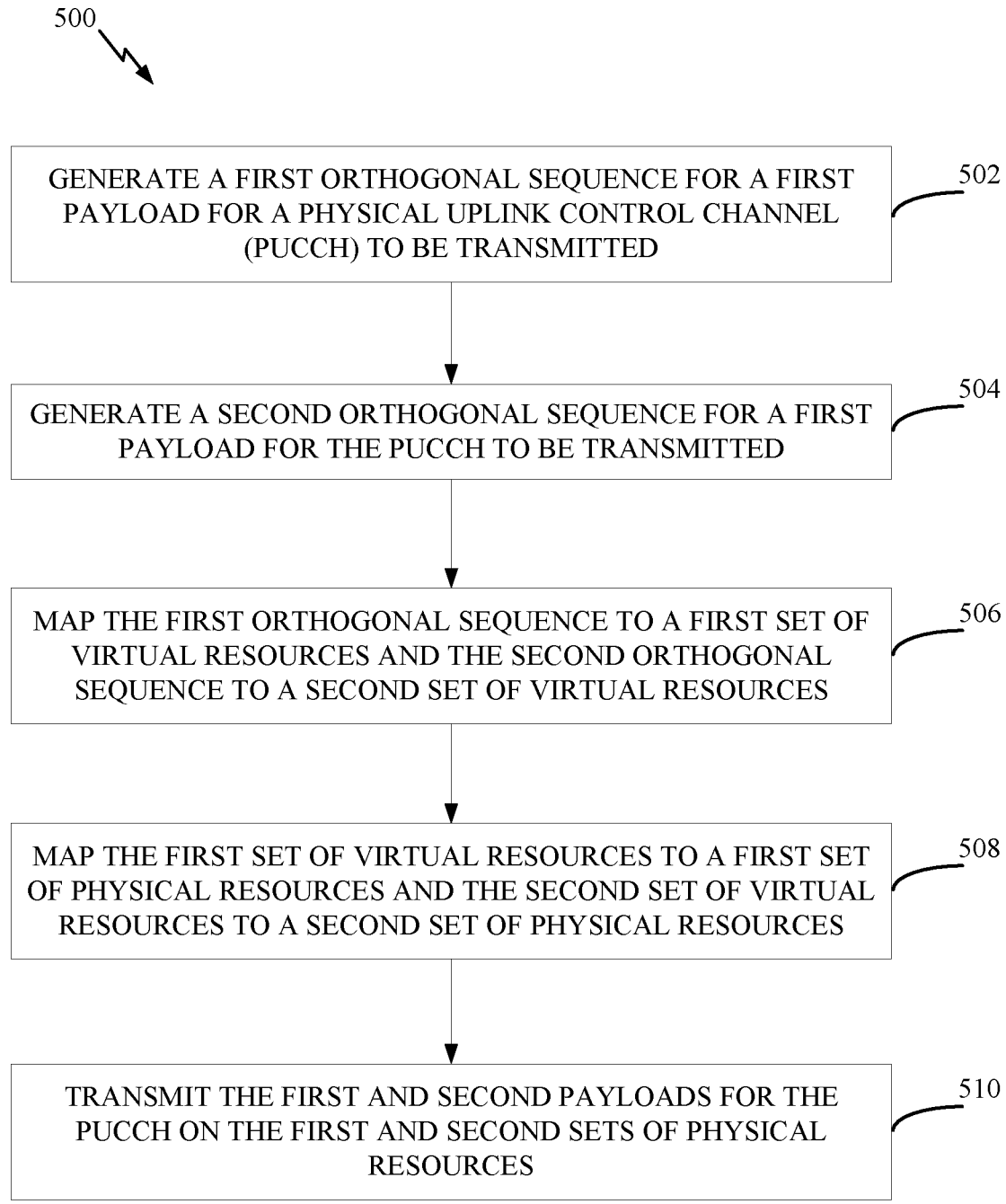
FIG. 5 illustrates example operations for wireless communication by a user equipment (UE), in accordance with some aspects of the present disclosure.

FIG. 5 illustrates example operations 500 that may be performed by a user equipment (UE) to allow for the coexistence of a sequence-based physical uplink control channel (PUCCH) and a legacy PUCCH format in a same resource.

As illustrated, operations 500 may begin at block 502, where the UE generates a first orthogonal sequence for a first payload for a physical uplink control channel (PUCCH) to be transmitted.

At block 504, the UE generates a second orthogonal sequence for a second payload for the PUCCH to be transmitted.

At block 506, the UE maps the first orthogonal sequence to a first set of virtual resources and the second orthogonal sequence to a second set of virtual resources. As discussed in further detail below, the sets of virtual resources may be resources in a virtual domain to which physical resources may be mapped. The first set of virtual resources may be a set of contiguous resources in the virtual domain into which a non-legacy PUCCH sequence may be mapped, and the second set of virtual resources may be a set of contiguous resources in the virtual domain into which a legacy PUCCH sequence may be mapped. Within each set of virtual resources, a pool of orthogonal sequences may be generated or defined. As discussed in further detail below, the sequences in the set of virtual resources may be generated according to the product of a discrete Fourier transform (DFT) sequence and a cyclic shift sequence, where the DFT sequence has a size of half the total number of OFDM symbols on which the PUCCH may be transmitted.

At block 508, the UE maps the first set of virtual resources to a first set of physical resources and the second set of virtual resources to a second set of physical resources. To map the sets of virtual resources to the sets of physical resources, the UE can, construct a set of code points based on a sequence pool. The set of code points for one set of virtual resources may, in some aspects, be established such that overlaps between code points associated with the DFT indices that are reserved for the other set of virtual resources are avoided. For example, if a code point index in one set of virtual resources is mapped to an overlapping index in the other set of virtual resources, the next non-overlapping code point may be used. In another example, the set of code points in one set of virtual resources may be constructed by excluding, a priori, overlapping code points in the other set of virtual resources.

At block 510, the UE transmits the first and second payloads for the PUCCH on the first and second sets of physical resources.

Figure 6:
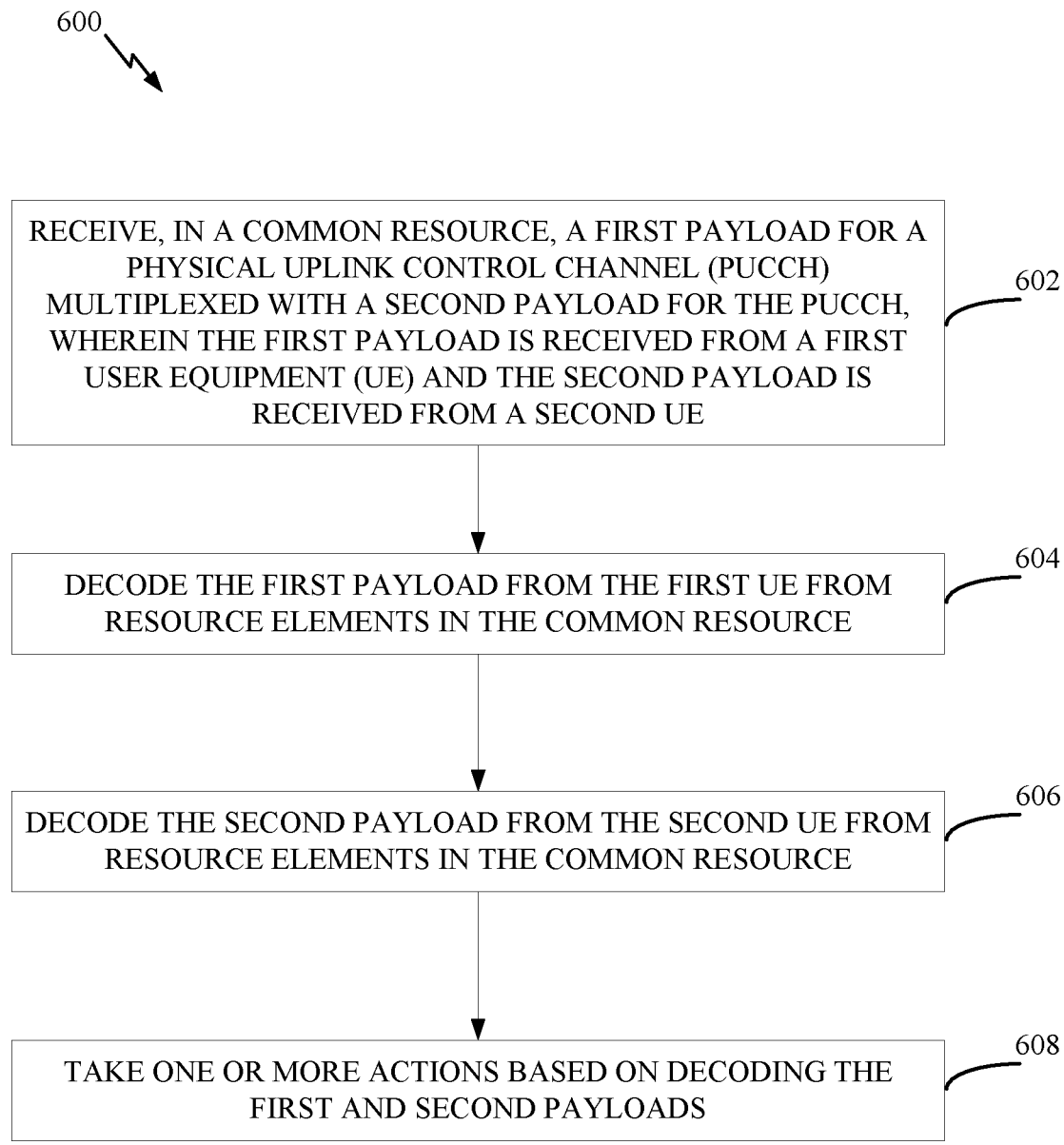
FIG. 6 illustrates example operations for wireless communication by a network entity, in accordance with some aspects of the present disclosure.

FIG. 6 illustrates example operations 600 that may be performed by a network entity to allow for the coexistence of different PUCCH formats transmitted by different UEs in a same resource.

Operations 600 may begin at block 602, where the network entity receives, in a common resource, a first payload for a physical uplink control channel multiplexed with a second payload for the PUCCH. The first payload may be received from a first UE, and the second payload may be received from a second UE.

At block 604, the network entity decodes the first payload from the first UE from resource elements in the common resource.

At block 606, the network entity decodes the second payload from the second UE from resource elements in the common resource.

At block 608, the network entity takes one or more actions based on the first orthogonal sequence and the second orthogonal sequence.

Figure 7:
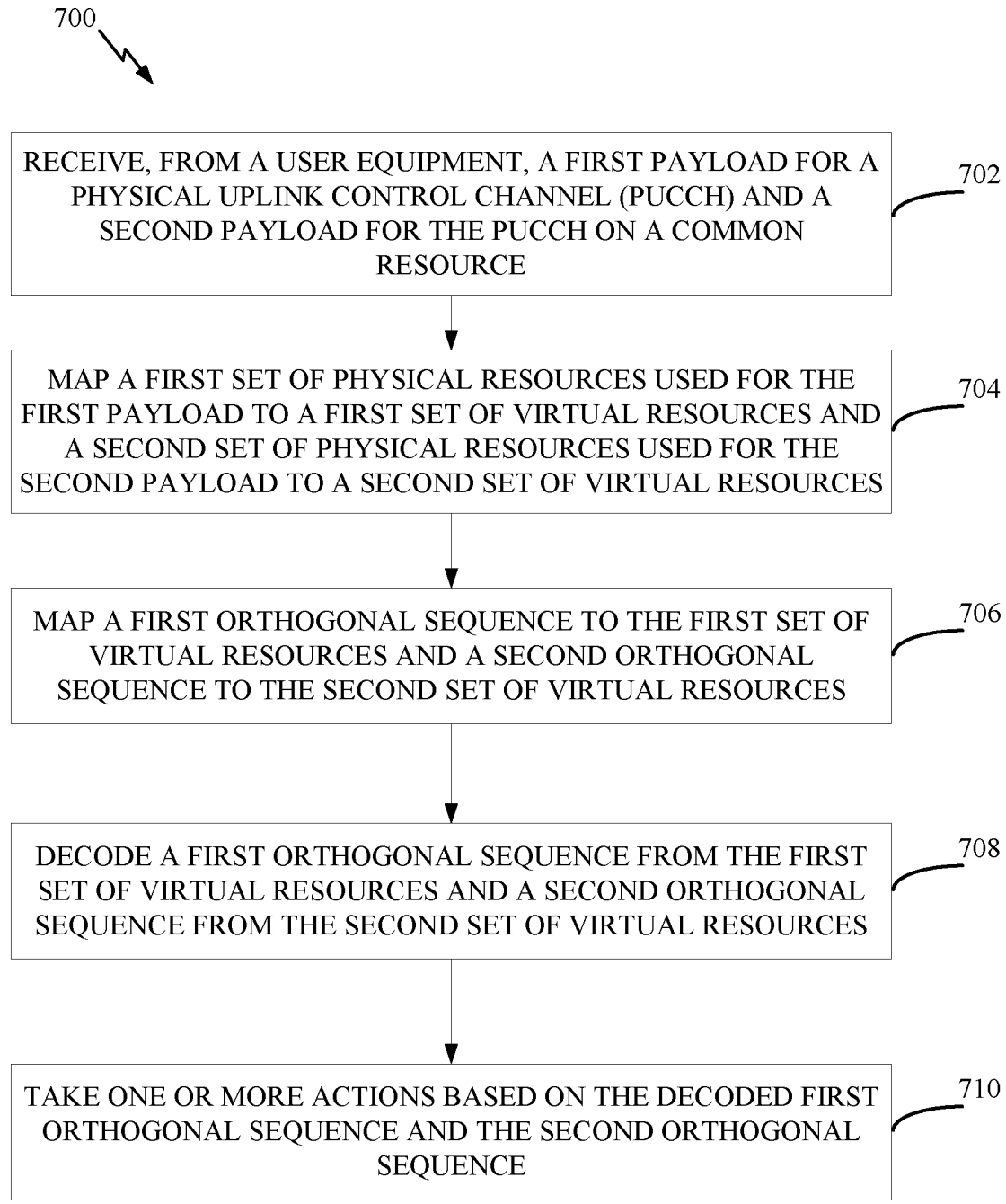
FIG. 7 illustrates example operations for wireless communication by a network entity, in accordance with some aspects of the present disclosure.

FIG. 7 illustrates example operations 700 that may be performed by a network entity to allow for the coexistence of different PUCCH formats (e.g., a payload using a legacy PUCCH format and a sequence-based PUCCH payload) transmitted by a same UE.

Operations 700 may begin at block 702, where a network entity receives, from a user equipment (UE), a first payload for a physical uplink control channel (PUCCH) and a second payload for the PUCCH on a common resource.

At block 704, the network entity maps a first set of physical resources used for the first payload to a first set of virtual resources and a second set of physical resources used for the second payload to a second set of virtual resources.

At block 706, the network entity maps a first orthogonal sequence to the first set of virtual resources and a second orthogonal sequence to the second set of virtual resources.

At block 708, the network entity decodes the first orthogonal sequence from the first set of virtual resources and the second orthogonal sequence from the second set of virtual resources.

At block 710, the network entity takes one or more actions based on the decoded first orthogonal sequence and the second orthogonal sequence.

In some aspects, the first and second payloads may be identical. For example, the first payload and the second payload may be duplicates of an uplink control information (UCI) payload that the UE is to transmit on the PUCCH. The first payload and the second payload may be transmitted, however, on different resources using different sequences generated from a unique combination of DFT indices and cyclic shift indices.

In some aspects, the first and second payloads may be different portions of a payload that the UE transmits on the PUCCH. For example, the first payload may be a first portion of an UCI payload, and the second payload may be a second portion of the UCI payload.

Figure 8:
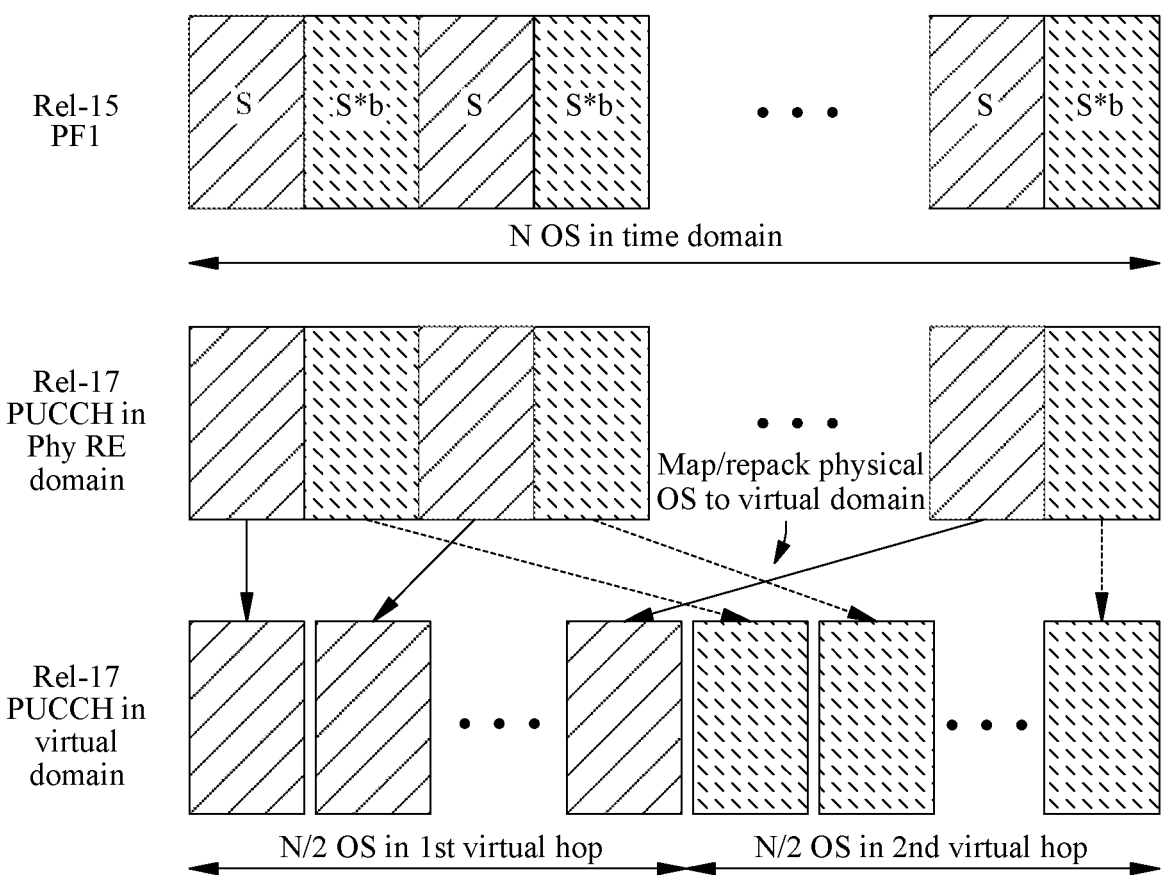
FIG. 8 illustrates an example mapping of legacy and sequence-based physical uplink control channel (PUCCH) payloads from physical resources to virtual resources, in accordance with some aspects of the present disclosure.

FIG. 8 illustrates an example mapping of virtual to physical resources used to allow for the coexistence of a sequence-based physical uplink control channel (PUCCH) and a legacy PUCCH format in a same resource. As discussed, it may not be possible to maintain orthogonality between a legacy and non-legacy PUCCH payload across both DMRS and UCI OFDM symbols (e.g., when the legacy and non-legacy PUCCH payloads are mapped to sequences using the same DFT indices and cyclic shift indices). To maintain orthogonality between these PUCCH payloads, physical resources may be mapped or repacked into two virtual hops (or blocks) in a virtual resource domain, and the non-legacy sequence-based PUCCH payloads may be generated individually in the two virtual hops in the virtual resource domain prior.

To generate orthogonal sequences in a virtual hop domain, a pool of orthogonal sequences may be generated based on the Kronecker product of a discrete Fourier transform (DFT) and a cyclic shift (CS) (e.g., as DFT(n)*S($CS_m$)). The size of the DFT may be one-half of the total number of OFDM symbols N used to transmit the PUCCH. If N is even, an identical sequence pool may be used to generate the first and second orthogonal sequences in the first and second virtual hops. If, however, N is odd, the DFT matrix used for the first virtual hop may have a size of $\lfloor N/2 \rfloor$, where $\lfloor \ \rfloor$ represents the floor function, and the DFT matrix used for the second virtual hop may have a size of $\lceil N/2 \rceil$, where $\lceil \ \rceil$ represents the ceiling function.

After generating the orthogonal sequence pool for the first and second virtual hops, a UE can generate a codebook of size $2^K$. UCI bits may be mapped to an integer I, and a sequence I in the codebook may be mapped to resource elements in each virtual hop. The resource elements in the virtual hops may be mapped back to physical resource elements for transmission.

In some aspects, the orthogonal sequence pool generated based on a DFT index n and a cyclic shift index m, where n represents the sequence from 0 to N/2 and m represents the sequence from 0 to M−1, may be shared between legacy and non-legacy UEs when allocated on a same resource (e.g., a resource block). When a legacy and a non-legacy UE are allocated the same resource for a PUCCH, the network entity may not allow the legacy and the non-legacy UE to use the same combination of DFT index n and CS index m. To configure the legacy and non-legacy UEs to use different combinations of DFT and CS indices, in some aspects, the network entity may signal, to a non-legacy UE, a list of DFT and CS index combinations to avoid when constructing a codebook from the pool of orthogonal sequences. In another aspect, the network entity can explicitly signal a codebook, with a size of $2^K$, to the non-legacy UE. In signaling the codebook, the network entity can explicitly signal $2^K$ pairs of DFT index n and CS index m that the non-legacy UE can use to generate a codebook. The signaling of indices to avoid or the codebook the UE can use may be performed via radio resource control (RRC) signaling, downlink control information (DCI), and/or a medium access control (MAC) control element (CE).

Figure 9A:
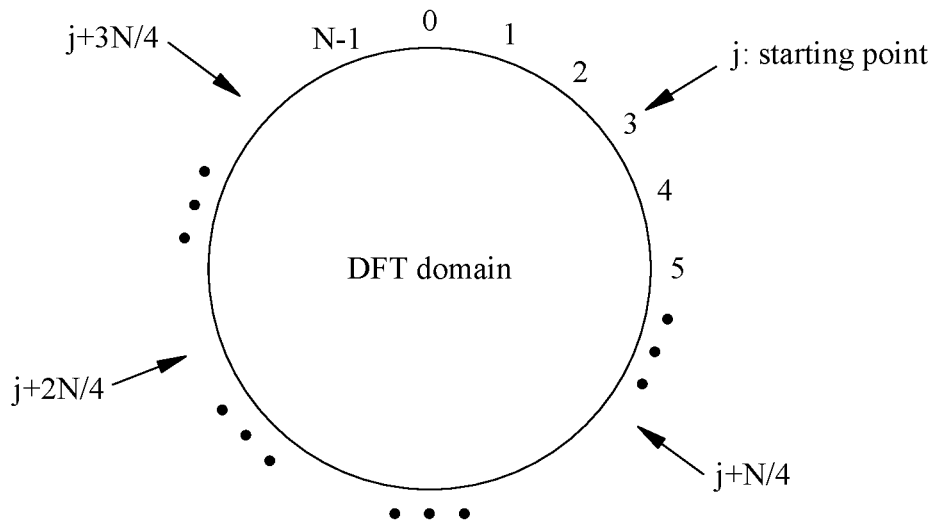
FIGS. 9A and 9B illustrate example codebook generation techniques that may be used for transmission of legacy and sequence-based physical uplink control channel (PUCCH) payloads, in accordance with some aspects of the present disclosure.
Figure 9B:
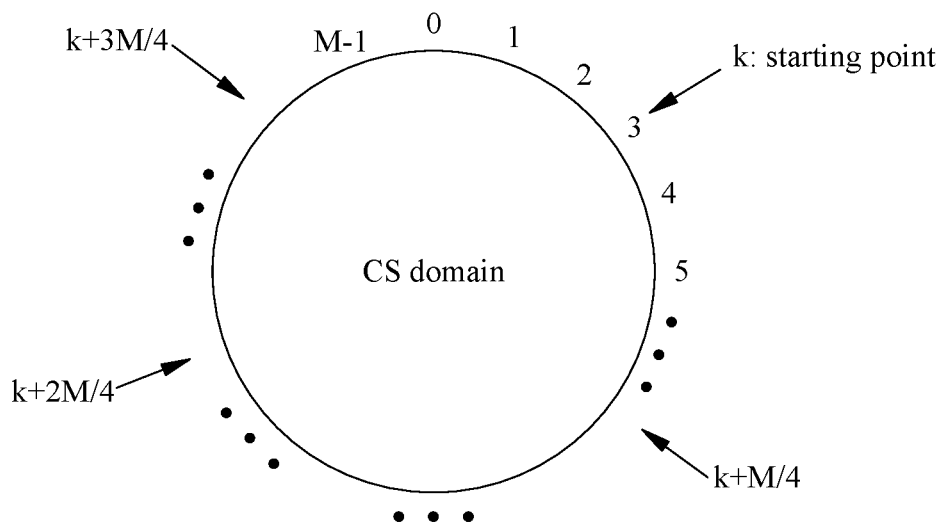

FIGS. 9A and 9B illustrate example of generating a codebook based on signaling indicating combinations of DFT and CS indices to avoid while generating the codebook. As illustrated, FIG. 9A illustrates a DFT domain, and FIG.

9B illustrates a CS domain. In the DFT domain, a cyclic structure can be built with indices 0-N-1. Similarly, in the CS domain, a cyclic structure can be built with indices 0-M-1.

In one example, as illustrated in FIGS. 9A and 9B, the cyclic structure may include indices that the network entity has signaled the UE to avoid using. Using a maximum distance between indices, a UE can use a starting point in the cyclic structures and follow the maximum distance criteria to construct the codepoints for the codebook. For example, as illustrated in FIGS. 9A and 9B, the maximum distance between indices may be one-quarter the total number N of DFT indices in the DFT domain and one-quarter the total number M of CS indices in the CS domain. Thus, initially, a sequence of DFT indices starting from index j may be represented as $$j, j+\frac{N}{4}, j+\frac{2N}{4}, j+\frac{3N}{4},$$

and a sequence of CS indices starting from index k may be represented as k, $$k+\frac{N}{4}, k+\frac{2N}{4}, k+\frac{3N}{4}.$$

If a DFT index in the sequence of DFT indices is in the list of indices that the network entity has signaled the UE to avoid using, the DFT index may be incremented until a DFT index is found that is not in the list of indices to avoid using. Similarly, if a CS index in the sequence of CS indices is in the list of indices that the network entity has signaled the UE to avoid using, the CS index may also be incremented until a CS index is found that is not in the list of indices to avoid using.

In another example, the cyclic structure may exclude indices that the network entity has signaled the UE to avoid using. The cyclic structures may be a virtual DFT and a virtual CS domain. Using a starting point signaled by the network entity and maximum distance criteria, the UE can generate a sequence of DFT and CS indices in the virtual DFT and CS domain. The sequence of DFT and CS indices may be mapped back to the physical DFT and CS domains to generate a codebook for the sequence-based PUCCH.

Figure 10:
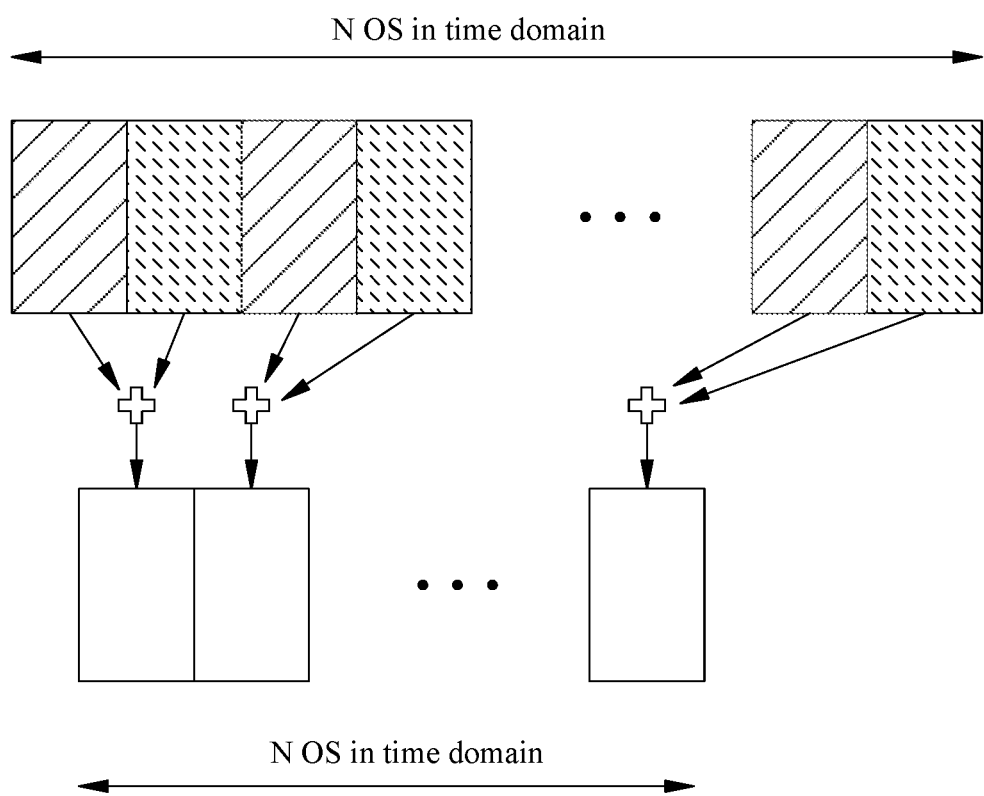
FIG. 10 illustrates an example combining of virtual resources to decode a legacy and a sequence-based physical uplink control channel (PUCCH) payload, in accordance with some aspects of the present disclosure.

FIG. 10 illustrates a pre-combination of a non-legacy (sequence-based) PUCCH and a legacy (e.g., Release 15, format 1) PUCCH in a same resource block, in accordance with some aspects of the present disclosure. As illustrated, for N orthogonal signals in the time domain, with N/2 symbols in a first virtual hop mapped to a first set of physical resources and N/2 symbols in a second virtual hop mapped to a second set of physical resources, a receiver (e.g., a network entity) can pre-combine across the two virtual hops. That is, for index n in the first virtual hop and the second virtual hop, the signals from the two virtual hops at index n may be combined prior to correlation with sequences in the sequence pool generated based on a DFT matrix with a size of N/2.

Figure 11:
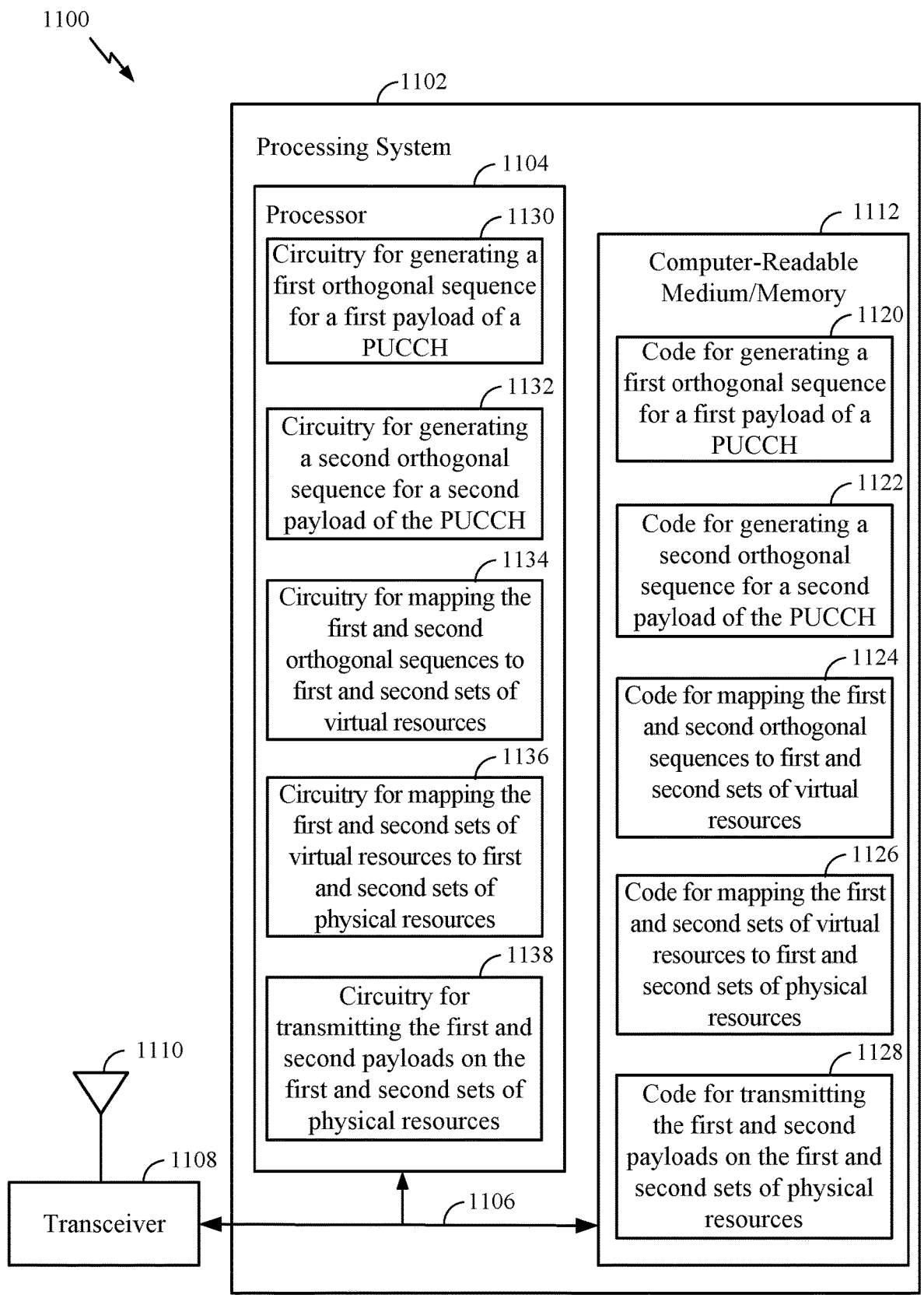
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 5. The communications device 1100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 5, or other operations for performing the various techniques discussed herein for the coexistence of a sequence-based physical uplink control channel (PUCCH) and a legacy PUCCH format in a same resource. In certain aspects, computer-readable medium/memory 1112 stores code 1120 for generating a first orthogonal sequence for a first payload of a PUCCH; code 1122 for generating a second orthogonal sequence for a second payload of the PUCCH; code 1124 for mapping the first and second orthogonal sequences to first and second sets of virtual resources; code 1126 for mapping the first and second sets of virtual resources to first and second sets of physical resources; and code 1128 for transmitting the first and second payloads on the first and second sets of physical resources. The processor 1114 includes circuitry 1130 for generating a first orthogonal sequence for a first payload of a PUCCH; circuitry 1132 for generating a second orthogonal sequence for a second payload of the PUCCH; circuitry 1134 for mapping the first and second orthogonal sequences to first and second sets of virtual resources; circuitry 1136 for mapping the first and second sets of virtual resources to first and second sets of physical resources; and circuitry 1138 for transmitting the first and second payloads on the first and second sets of physical resources.

Figure 12:
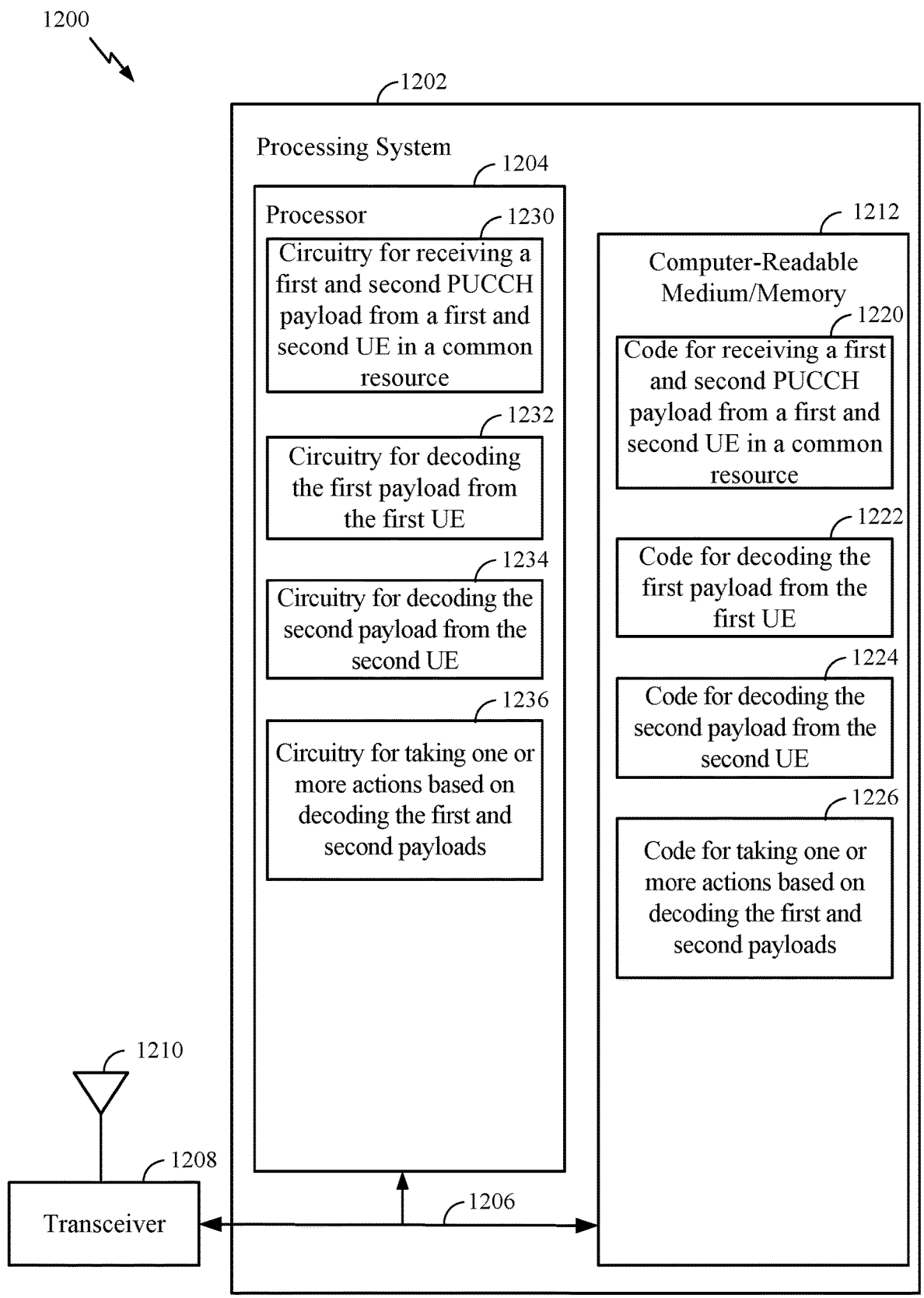
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 6. The communications device 1200 includes a processing system 1202 coupled to a transceiver 1208. The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 6, or other operations for performing the various techniques discussed herein for the coexistence of a sequence-based physical uplink control channel (PUCCH) and a legacy PUCCH format in a same resource. In certain aspects, computer-readable medium/memory 1212 stores code 1220 for receiving a first and second PUCCH payload from a first and second UE; code 1222 for decoding the first PUCCH payload from the first UE; code 1224 for decoding the second PUCCH payload from the second UE; and code 1226 for taking one or more actions based on decoding the first and second PUCCH payloads. The processor 1214 includes circuitry 1230 for receiving a first and second PUCCH payload from a first and second UE; circuitry 1232 for decoding the first PUCCH payload from the first UE; circuitry 1234 for decoding the second PUCCH payload from the second UE; and circuitry 1236 for taking one or more actions based on decoding the first and second PUCCH payloads.

Figure 13:
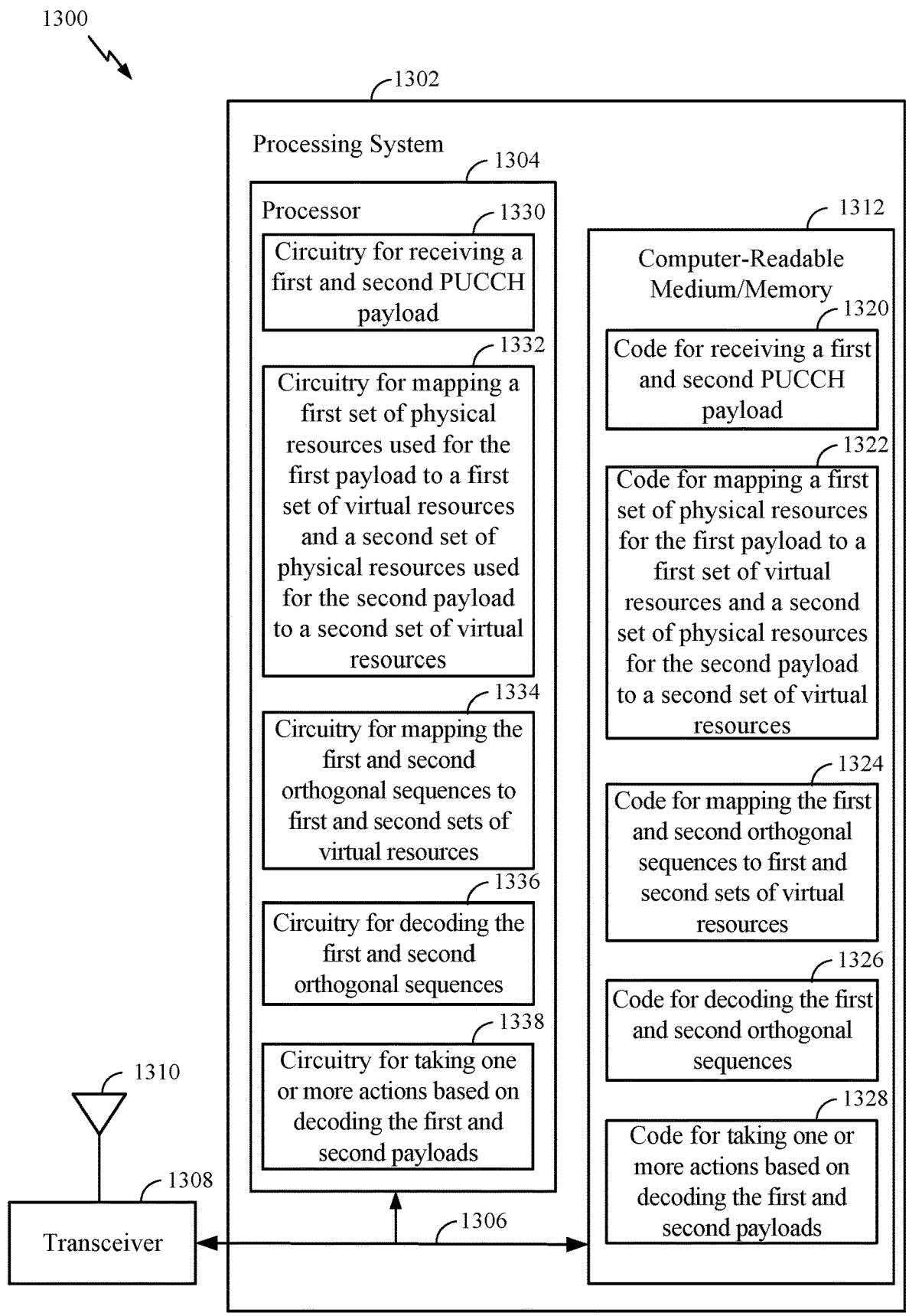
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 7. The communications device 1300 includes a processing system 1302 coupled to a transceiver 1308. The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 7, or other operations for performing the various techniques discussed herein for the coexistence of a sequence-based physical uplink control channel (PUCCH) and a legacy PUCCH format in a same resource. In certain aspects, computer-readable medium/memory 1312 stores code 1320 for receiving a first and a second payload for a PUCCH; code 1322 for mapping a first set of physical resources used for the first payload to a first set of virtual resources and a second set of physical resources used for the second payload to a second set of virtual resources; code 1324 for mapping the first and second orthogonal sequences to first and second sets of virtual resources; code 1326 for decoding the first and second orthogonal sequences; and code 1328 for taking one or more actions based on decoding the first and second orthogonal sequences. The processor 1314 includes circuitry 1330 for receiving a first and a second payload for a PUCCH; circuitry 1332 for mapping a first set of physical resources used for the first payload to a first set of virtual resources and a second set of physical resources used for the second payload to a second set of virtual resources; circuitry 1334 for mapping the first and second orthogonal sequences to first and second sets of virtual resources; circuitry 1336 for decoding the first and second orthogonal sequences; and circuitry 1338 for taking one or more actions based on decoding the first and second orthogonal sequences.

Example Clauses

Clause 1: A method for wireless communications by a user equipment (UE), comprising generating a first orthogonal sequence for a first payload for a physical uplink control channel (PUCCH) to be transmitted, generating a second orthogonal sequence for a second payload for the PUCCH to be transmitted, mapping the first orthogonal sequence to a first set of virtual resources and the second orthogonal sequence to a second set of virtual resources, mapping the first set of virtual resources to a first set of physical resources and the second set of virtual resources to a second set of physical resources, and transmitting the first and second payloads for the PUCCH on the first and second sets of physical resources.

Clause 2: The method of Clause 1, wherein the first payload and the second payload are identical.

Clause 3: The method of Clause 2, wherein the first payload and the second payload comprise duplicates of an uplink control information (UCI) payload the UE is to transmit on the PUCCH.

Clause 4: The method of any of Clauses 1 to 3, wherein the first payload comprises a first portion of an uplink control information (UCI) payload the UE is to transmit on the PUCCH and the second payload comprises a second portion of the UCI payload.

Clause 5: The method of any of Clauses 1 to 4, wherein the first and second orthogonal sequences are generated based on a discrete Fourier transform (DFT) with a size of half of a total number of OFDM symbols allocated for transmitting the first and second payloads for the PUCCH and a cyclic shift.

Clause 6: The method of Clause 5, wherein the total number of OFDM symbols allocated for transmitting the first and second types of PUCCHs is an odd number, a size of the DFT used to generate the first orthogonal sequence comprises a floor of half the total number of OFDM symbols, and a size of the DFT used to generate the second orthogonal sequence comprises a ceiling of half the total number of OFDM symbols.

Clause 7: The method of any of Clauses 1 to 6, wherein generating the first and second orthogonal sequence comprises generating a codebook, mapping uplink control information (UCI) bits to an integer in the codebook, and mapping a sequence associated with the integer in the codebook to resource elements in the set of virtual resources.

Clause 8: The method of any of Clause 1 to 7, further comprising receiving signaling from a network entity including information associated with a codebook to be used to generate the first and second orthogonal sequences.

Clause 9. The method of Clause 8, wherein the information associated with the codebook to be used to generate the first and second orthogonal sequences comprises information identifying one or more of discrete Fourier transform (DFT) indices or cyclic shift (CS) indices to avoid while generating the codebook used to generate the first and second orthogonal sequences.

Clause 10: The method of Clause 9, further comprising generating circular arrangement of DFT or CS indices, identifying a set of DFT or CS indices in the circular arrangement from a starting index and a maximum distance signaled by the network entity, adjusting the identified set of DFT or CS indices such that no index in the identified set is included in the identified one or more DFT or CS indices to avoid, and generating the codebook based on the adjusted set of DFT or CS indices.

Clause 11: The method of Clauses 9 or 10, further comprising generating a circular arrangement of DFT or CS indices excluding the identified one or more DFT or CS indices to avoid, identifying a set of DFT or CS indices in the circular arrangement based on a starting index and a maximum distance signaled by the network entity, and generating the codebook based on the identified set of DFT or CS indices.

Clause 12: The method of any of Clauses 8 to 11, wherein the information associated with the codebook to be used to generate the first and second orthogonal sequences comprises a codebook generated by the network entity.

Clause 13: The method of any of Clauses 8 to 12, wherein the information associated with the codebook to be used to generate the first and second orthogonal sequences is received via radio resource control (RRC) signaling, downlink control information (DCI) signaling, or a medium access control (MAC) control element (CE).

Clause 14: The method of any of Clauses 1 to 13, wherein: the first set of virtual resources comprise virtual resource elements (REs) in a first hop in a virtual resource domain, the second set of virtual resources comprise virtual REs in a second hop in the virtual resource domain, and mapping the first set of virtual resources to a first set of physical resources and the second set of virtual resources to a second set of physical resources comprises mapping the virtual REs in the first hop to a first set of physical REs and mapping the virtual REs in the second hop to a second set of physical REs.

Clause 15: A method for wireless communications by a network entity, comprising receiving, in a common resource, a first payload for a physical uplink control channel (PUCCH) multiplexed with a second payload for the PUCCH, wherein the first payload for the PUCCH is received from a first user equipment (UE) and the second payload for the PUCCH is received from a second user equipment (UE), decoding the first payload for the first UE from resource elements in the common resource, decoding the second payload for the second UE from resource elements in the common resource, and taking one or more actions based on decoding the first and second payloads.

Clause 16: The method of Clause 15, wherein the first payload comprises a legacy PUCCH payload and the second payload comprises a non-legacy sequence-based PUCCH payload.

Clause 17: The method of Clauses 15 or 16, wherein the first payload comprises a first non-legacy sequence-based PUCCH payload and the second payload comprises a second non-legacy sequence-based PUCCH payload.

Clause 18: A method for wireless communication by a network entity, comprising receiving, from a user equipment (UE), a first payload for a physical uplink control channel (PUCCH) and a second payload for the PUCCH on a common resource, mapping a first set of physical resources used for the first payload to a first set of virtual resources and mapping a second set of physical resources used for the second payload to a second set of virtual resources, mapping a first orthogonal sequence to the first set of virtual resources and a second orthogonal sequence to the second set of virtual resources, decoding the first orthogonal sequence from the first set of virtual resources and the second orthogonal sequence from the second set of virtual resources, and taking one or more actions based on the decoded first and second orthogonal sequences.

Clause 19: The method of Clause 18, wherein the first payload and the second payload are identical.

Clause 20: The method of Clause 19, wherein the first payload and the second payload comprise duplicates of an uplink control information (UCI) transmitted by a user equipment (UE) on the PUCCH.

Clause 21: The method of any of Clauses 18 to 20, wherein the first payload comprises a first portion of an uplink control information (UCI) payload and the second payload comprises a second portion of the UCI payload transmitted by a user equipment (UE).

Clause 22: The method of any of Clauses 18 to 21, wherein the first and second orthogonal sequences comprise sequences generated based on a discrete Fourier transform (DFT) with a size of half of a total number of OFDM symbols allocated for transmitting the first and second payloads for the PUCCH and a cyclic shift.

Clause 23: The method of Clause 22, wherein the total number of OFDM symbols allocated for transmitting the first and second types of PUCCHs is an odd number, a size of the DFT used to generate the first orthogonal sequence comprises a floor of half the total number of OFDM symbols, and a size of the DFT used to generate the second orthogonal sequence comprises a ceiling of half the total number of OFDM symbols.

Clause 24: The method of any of Clauses 18 to 23, further comprising signaling, to a user equipment (UE), information associated with a codebook to be used to generate the first and second orthogonal sequences.

Clause 25: The method of Clause 24, wherein the information associated with the codebook to be used to generate the first and second orthogonal sequences comprises information identifying one or more of discrete Fourier transform (DFT) indices or cyclic shift (CS) indices to avoid while generating the codebook to be used to generate the first and second orthogonal sequences.

Clause 26: The method of Clauses 24 or 25, wherein the information associated with the codebook to be used to generate the first and second orthogonal sequences comprises a codebook generated by the network entity.

Clause 27: The method of any of Clauses 24 to 26, wherein the information associated with the codebook to be used to generate the first and second orthogonal sequences is received via radio resource control (RRC) signaling, downlink control information (DCI) signaling, or a medium access control (MAC) control element (CE).

Clause 28: The method of any of Clauses 24 to 27, wherein the first set of virtual resources comprise virtual resource elements (REs) in a first hop in a virtual resource domain, the second set of virtual resources comprise virtual REs in a second hop in the virtual resource domain, and mapping the physical resources to the first set of virtual resources and the second set of virtual resources comprises mapping a first set of physical REs to virtual REs in the first hop and mapping a second set of physical REs to the virtual REs in the second hop.

Clause 29: The method of Clause 28, wherein decoding the first orthogonal sequence for the first payload from the first set of virtual resources and the second orthogonal sequence for the second payload from the second set of virtual resources comprises precombining the first and second virtual hops, and correlating sequences in the precombined first and second virtual hops to sequences in a sequence pool generated based on a discrete Fourier transform (DFT) matrix having a size that is half of a total number of OFDM symbols allocated for transmitting the first and second payloads for the PUCCH.

Clause 30: A system, comprising a memory and a processor configured to perform the operations of any of Clauses 1 through 14.

Clause 31: A system, comprising a memory and a processor configured to perform the operations of any of Clauses 15 through 17.

Clause 32: A system, comprising: a memory and a processor configured to perform the operations of any of Clauses 18 through 29.

Clause 33: A system, comprising means for performing the operations of any of Clauses 1 through 14.

Clause 34: A system, comprising means for performing the operations of any of Clauses 15 through 17.

Clause 35: A system, comprising means for performing the operations of any of Clauses 18 through 29.

Clause 36: A computer-readable medium having instructions stored thereon which, when executed by a processor, performs the operations of any of Clauses 1 through 14.

Clause 37: A computer-readable medium having instructions stored thereon which, when executed by a processor, performs the operations of any of Clauses 15 through 17.

Clause 38: A computer-readable medium having instructions stored thereon which, when executed by a processor, performs the operations of any of Clauses 18 through 29.

Additional Considerations

The techniques described herein may be used for various wireless communication technologies, such as NR (for example, 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, or 5G wireless technologies, aspects of the present disclosure can be applied in other generation-based communication systems.

In 3GPP, the term "cell" can refer to a coverage area of a Node B (NB) or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, or other types of cells. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having an association with the femto cell (for example, UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (for example, a smart ring, a smart bracelet, etc.), an entertainment device (for example, a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, which may be narrowband IoT (NB-IoT) devices.

Some wireless networks (for example, LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (for example, 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (for example, 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing.

The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (for example, a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (for example, one or more other UEs), and the other UEs may utilize the resources scheduled by the UE for wireless communication. In some examples, a UE may function as a scheduling entity in a peer-to-peer (P2P) network, or in a mesh network. In a mesh network example, UEs may communicate directly with one another in addition to communicating with a scheduling entity.

As used herein, the term "determining" may encompass one or more of a wide variety of actions. For example, "determining" may include calculating, computing, processing, deriving, investigating, looking up (for example, looking up in a table, a database or another data structure), assuming and the like. Also, "determining" may include receiving (for example, receiving information), accessing (for example, accessing data in a memory) and the like. Also, "determining" may include resolving, selecting, choosing, establishing and the like.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The invention claimed is:

1. A method for wireless communications by a user equipment (UE), comprising:
   generating a first orthogonal sequence for a first payload for a physical uplink control channel (PUCCH) to be transmitted;
   generating a second orthogonal sequence for a second payload for the PUCCH to be transmitted;
   receiving signaling from a network entity including information associated with a codebook to be used to generate the first and second orthogonal sequences, wherein the information associated with the codebook to be used to generate the first and second orthogonal sequences comprises information identifying one or more of discrete Fourier transform (DFT) indices or cyclic shift (CS) indices to avoid while generating the codebook used to generate the first and second orthogonal sequences;
   mapping the first orthogonal sequence to a first set of virtual resources and the second orthogonal sequence to a second set of virtual resources;
   mapping the first set of virtual resources to a first set of physical resources and the second set of virtual resources to a second set of physical resources; and
   transmitting the first and second payloads for the PUCCH on the first and second sets of physical resources.

2. The method of claim 1, wherein the first payload and the second payload are identical.

3. The method of claim 2, wherein the first payload and the second payload comprise duplicates of an uplink control information (UCI) payload the UE is to transmit on the PUCCH.

4. The method of claim 1, wherein the first payload comprises a first portion of an uplink control information (UCI) payload the UE is to transmit on the PUCCH and the second payload comprises a second portion of the UCI payload.

5. The method of claim 1, wherein the first and second orthogonal sequences are generated based on a discrete Fourier transform (DFT) with a size of half of a total number of OFDM symbols allocated for transmitting the first and second payloads for the PUCCH and a cyclic shift.

6. The method of claim 5, wherein a size of the DFT used to generate the first orthogonal sequence comprises a floor of half the total number of OFDM symbols, and a size of the DFT used to generate the second orthogonal sequence comprises a ceiling of half the total number of OFDM symbols.

7. The method of claim 1, wherein generating the first and second orthogonal sequence comprises:
generating the codebook;
mapping uplink control information (UCI) bits to an integer in the codebook; and
mapping a sequence associated with the integer in the codebook to resource elements in the set of virtual resources.

8. The method of claim 1, further comprising:
generating a circular arrangement of DFT or CS indices;
identifying a set of DFT or CS indices in the circular arrangement from a starting index and a maximum distance signaled by the network entity;
adjusting the identified set of DFT or CS indices such that no index in the identified set is included in the identified one or more DFT or CS indices to avoid; and
generating the codebook based on the adjusted set of DFT or CS indices.

9. The method of claim 1, further comprising:
generating a circular arrangement of DFT or CS indices excluding the identified one or more DFT or CS indices to avoid;
identifying a set of DFT or CS indices in the circular arrangement based on a starting index and a maximum distance signaled by the network entity; and
generating the codebook based on the identified set of DFT or CS indices.

10. The method of claim 1, wherein the information associated with the codebook to be used to generate the first and second orthogonal sequences is received via radio resource control (RRC) signaling, downlink control information (DCI) signaling, or a medium access control (MAC) control element (CE).

11. The method of claim 1, wherein:
the first set of virtual resources comprise virtual resource elements (REs) in a first hop in a virtual resource domain;
the second set of virtual resources comprise virtual REs in a second hop in the virtual resource domain; and
mapping the first set of virtual resources to a first set of physical resources and the second set of virtual resources to a second set of physical resources comprises mapping the virtual REs in the first hop to a first set of physical REs and mapping the virtual REs in the second hop to a second set of physical REs.

12. A method for wireless communication by a network entity, comprising:
receiving, from a user equipment (UE), a first payload for a physical uplink control channel (PUCCH) and a second payload for the PUCCH on a common resource;
mapping a first set of physical resources used for the first payload to a first set of virtual resources and mapping a second set of physical resources used for the second payload to a second set of virtual resources;
mapping a first orthogonal sequence to the first set of virtual resources and a second orthogonal sequence to the second set of virtual resources;
signaling, to the user equipment (UE), information associated with a codebook to be used to generate the first and second orthogonal sequences, wherein the information associated with the codebook to be used to generate the first and second orthogonal sequences comprises information identifying one or more of discrete Fourier transform (DFT) indices or cyclic shift (CS) indices to avoid while generating the codebook to be used to generate the first and second orthogonal sequences;
decoding the first orthogonal sequence from the first set of virtual resources and the second orthogonal sequence from the second set of virtual resources; and
taking one or more actions based on the decoded first and second orthogonal sequences.

13. The method of claim 12, wherein the first payload and the second payload are identical.

14. The method of claim 13, wherein the first payload and the second payload comprise duplicates of an uplink control information (UCI) transmitted by a user equipment (UE) on the PUCCH.

15. The method of claim 12, wherein the first payload comprises a first portion of an uplink control information (UCI) payload and the second payload comprises a second portion of the UCI payload transmitted by the user equipment (UE).

16. The method of claim 12, wherein the first and second orthogonal sequences comprise sequences generated based on a discrete Fourier transform (DFT) with a size of half of a total number of OFDM symbols allocated for transmitting the first and second payloads for the PUCCH and a cyclic shift.

17. The method of claim 16, wherein a size of the DFT used to generate the first orthogonal sequence comprises a floor of half the total number of OFDM symbols, and a size of the DFT used to generate the second orthogonal sequence comprises a ceiling of half the total number of OFDM symbols.

18. The method of claim 12, wherein the information associated with the codebook to be used to generate the first and second orthogonal sequences is received via radio resource control (RRC) signaling, downlink control information (DCI) signaling, or a medium access control (MAC) control element (CE).

19. The method of claim 12, wherein:
the first set of virtual resources comprise virtual resource elements (REs) in a first hop in a virtual resource domain;
the second set of virtual resources comprise virtual REs in a second hop in the virtual resource domain; and
mapping the physical resources to the first set of virtual resources and the second set of virtual resources comprises mapping a first set of physical REs to virtual REs in the first hop and mapping a second set of physical REs to the virtual REs in the second hop.

20. The method of claim 19, wherein decoding the first orthogonal sequence for the first payload from the first set of virtual resources and the second orthogonal sequence for the second payload from the second set of virtual resources comprises:
  precombining the first and second virtual hops; and
  correlating sequences in the precombined first and second virtual hops to sequences in a sequence pool generated based on a discrete Fourier transform (DFT) matrix having a size that is half of a total number of OFDM symbols allocated for transmitting the first and second payloads for the PUCCH.

21. An apparatus for wireless communication by a user equipment (UE), comprising:
  memory; and
  one or more processors coupled to the memory and, individually or collectively, configured to cause the apparatus to:
    generate a first orthogonal sequence for a first payload for a physical uplink control channel (PUCCH) to be transmitted;
    generate a second orthogonal sequence for a second payload for the PUCCH to be transmitted;
    receive signaling from a network entity including information associated with a codebook to be used to generate the first and second orthogonal sequences, wherein the information associated with the codebook to be used to generate the first and second orthogonal sequences comprises information identifying one or more of discrete Fourier transform (DFT) indices or cyclic shift (CS) indices to avoid while generating the codebook used to generate the first and second orthogonal sequences;
    map the first orthogonal sequence to a first set of virtual resources and the second orthogonal sequence to a second set of virtual resources;
    map the first set of virtual resources to a first set of physical resources and the second set of virtual resources to a second set of physical resources; and
    transmit the first and second payloads for the PUCCH on the first and second sets of physical resources.

22. An apparatus for wireless communication by a network entity, comprising:
  a memory; and
  one or more processors coupled to the memory and, individually or collectively, configured to cause the apparatus to:
    receive, from a user equipment (UE), a first payload for a physical uplink control channel (PUCCH) and a second payload for the PUCCH on a common resource;
    map a first set of physical resources used for the first payload to a first set of virtual resources and mapping a second set of physical resources used for the second payload to a second set of virtual resources;
    map a first orthogonal sequence to the first set of virtual resources and a second orthogonal sequence to the second set of virtual resources;
    signal, to the user equipment (UE), information associated with a codebook to be used to generate the first and second orthogonal sequences, wherein the information associated with the codebook to be used to generate the first and second orthogonal sequences comprises information identifying one or more of discrete Fourier transform (DFT) indices or cyclic shift (CS) indices to avoid while generating the codebook to be used to generate the first and second orthogonal sequences;
    decode the first orthogonal sequence from the first set of virtual resources and the second orthogonal sequence from the second set of virtual resources; and
    take one or more actions based on the decoded first and second orthogonal sequences.

* * * * *